United States Patent [19]

Bertrand

[11] Patent Number: 4,650,816
[45] Date of Patent: Mar. 17, 1987

[54] EXPANDED POLYPROPYLENE AND ARTICLES THEREOF

[75] Inventor: Jean-Noël M. Bertrand, Wezembeek-Oppem, Belgium

[73] Assignee: Montefina, S.A., Brussels, Belgium

[21] Appl. No.: 782,636

[22] Filed: Sep. 30, 1985

[51] Int. Cl.$^4$ ............................................. C08J 9/08
[52] U.S. Cl. ........................................ 521/85; 521/79; 521/88; 521/91; 521/97; 521/143; 521/144; 521/908; 525/240
[58] Field of Search .................... 521/79, 143, 144, 85, 521/88, 91, 97; 525/240

[56] References Cited

U.S. PATENT DOCUMENTS

| | | | |
|---|---|---|---|
| 3,207,739 | 9/1965 | Wales | 525/240 |
| 3,268,499 | 8/1966 | Wales | 525/240 |
| 3,725,317 | 4/1973 | Roden | 521/79 |
| 3,808,300 | 4/1974 | Miyamoto et al. | 521/79 |
| 3,839,238 | 10/1974 | Ealding | 521/79 |
| 3,962,154 | 6/1976 | Elgi | 521/79 |
| 4,407,768 | 10/1983 | Garcia | 521/79 |

OTHER PUBLICATIONS

"Crystallization-Modified Polypropylene", Kuhre et al, SPE Journal, Oct., 1964, pp. 1113-1119.

*Primary Examiner*—Morton Foelak
*Attorney, Agent, or Firm*—John K. Abokhair; M. Norwood Cheairs

[57] ABSTRACT

Disclosed are rigid materials such as sheets, boards or tubes made of expanded polypropylene, which have a uniform specific gravity d of from about $4.1 \times 10^{-6}$ to about $8.1 \times 10^{-6}$ Newton/mm$^3$, a crystallization temperature of from about 115° C. to about 135° C. and a flexural modulus Mf expressed in Newton/mm$^3$ such that the ratio Mf:d is from about $1.5 \times 10^8$ to about $1.7 \times 10^8$ mm.

17 Claims, No Drawings

EXPANDED POLYPROPYLENE AND ARTICLES THEREOF

FIELD OF THE INVENTION

The present invention relates to improved expanded or foamed polypropylene. More particularly, the present invention relates to rigid articles made of expanded crystallne polypropylene. Additionally, the present invention provides a process for making rigid articles of expanded polypropylene having improved physical properties.

BACKGROUND OF THE INVENTION

The terms "rigid articles" or "rigid materials", as used herein, means tubes, sheets, plates, boards and other similar materials which are obtained by extrusion, together with various articles manufactured from these extruded materials, for example, articles made by thermoforming extruded sheets.

The art is replete with methods for making articles from foamed polystyrene. The foamed polystyrene articles have good rigidity and shape retention, but have the disadvantages of being fragile and having poor chemical resistance, oil resistance and thermal stability. Generally, polypropylene has excellent heat resistance, oil resistance and chemical resistance, high mechanical strength, higher flexibility or better elasticity than polystyrene, and higher rigidity than polyethylene. Accordingly, various atttempts have been made to obtain expanded or foamed articles by using polypropylene having these excellent properties.

U.S. Pat. No. 4,442,233 to Lohmar et al, relates to a process for producing cross-linked polypropylene with from about 2 to about 20 weight percent, based upon the weight of the polypropylene of polybutadiene with a molecular weight of from about 500 to about 10,000 under conditions sufficient to effect cross-linking, for example, through the use of cross-linking agents and/or irradiation. In addition, the process disclosed therein may be utilized to produce cross-linked and foamed polypropylenes.

U.S. Pat. No. 4,379,859 to Hirosawa et al, disclosed substantially non-crosslinked pre-foamed particles of a polypropylene resin, characterized by the fact that they are composed of an ethylene/propylene random copolymer or a mixture of an ethylene/propylene random copolymer with low density polyethylene and/or an ethylene/vinyl acetate copolymer as a base resin; and a process for producing pre-foamed particles of a polypropylene resin, which comprises dispersing substantially non-crosslinked particles of the polypropylene resin composed of an ethylene/propylene random copolymer or a mixture of an ethylene/propylene random copolymer with low-density polyethylene and/or an ethylene/vinyl acetate copolymer and a volatile blowing agent in water in the presence of a dispersing agent within a closed vessel; heating the dispersion to a temperature above a temperature at which the resin particles soften, thereby to impregnate the blowing agent in the resin particles; and while maintaining the pressure of the inside of the vessel higher than the vapor pressure of the blowing agent, opening one of the vessel to release the resin prticles and water simultaneously into an atmosphere kept at a lower pressure than the inside of the vessel.

U.S. Pat. No. 4,303,757 to Kajimura et al, discloses a process for producing expandable thermoplastic resin beads which comprises suspending in an aqueous medium 20 to 70% by weight of polypropylene resin particles and 30 to 80% by weight of a vinyl aromatic monomer such as styrene, polymerizing the vinyl aromatic monomer in the presence of a polymerization catalyst to graft the vinyl aromatic monomer onto the backbone of polypropylene and, optionally, adding a cross-linking agent, to form graft-copolymerized thermoplastic resin beads, and introducing a blowing agent into the thermoplastic resin beads. The resulting resin beads have good foamability and molding fusability, and a foamed shaped article having good thermal stability can be prepared from these beads.

U.S. Pat. No. 4,298,706 to Ueno et al, described foams of polypropylene resin composition having remarkably improved extrusion foaming characteristics prepared by a non-crosslinking extrusion foaming process comprising mixing and kneading polypropylene resin and 1,2-polybutadiene resin so that 1,2-polybutadiene resin reacts under the influence of the heat and shearing stress in the extruder, and extruding thereafter.

As can be seen from the above, the art does not provide a method to obtain articles, having good physical characteristics, from foamed or expanded polypropylene without the addition of significant amounts of polystyrene, polybutadiene and the like. Even with the utilization of highly specialized and specific processes, blowing agents and other additives, the heretofore known conventional processes for forming expanded polypropylene produce cells of uneven structure and give surface irregularities and poor appearance to the resulting foam, thereby yielding products of reduced commercial value.

Additionally, previously known methods for producing expanded polypropylene articles have certain disadvantages. For example, such articles have poor mechanical strength, and more particularly poor flexural strength. Moreover, the specific gravity or density of such articles is not always homogeneous. Thus, the articles may contain density variations that may reach about 10%.

SUMMARY OF THE INVENTION

An object of the present invention is to provide expanded polypropylene rigid materials, the mechanical properties of which are improved.

Another object of the present invention is to provide expanded polypropylene rigid materials which have a high crystallization temperature.

Still another object of the present invention is to provide expanded crystalline polypropylene rigid materials having a uniform specific gravity.

In accomplishing the foregoing objects, there is provided rigid materials made of expanded polypropylene and characterized by having (i) a uniform specific gravity d of from about $4.1 \times 10^{-6}$ to about $8.1 \times 10^{-6}$ Newton/mm$^3$, (ii) a crystallization temperature of from about 115° to about 135° C., and (iii) a flexural modulus Mf expressed in Newton/mm$^2$ such that the ratio Mf:d is from about $1.50 \times 10^8$ to about $1.70 \times 10^8$ mm.

The rigid materials of the present invention may be obtained from a composition which essentially comprises isotactic polypropylene, an agent which increases the crystallization speed, a blowing agent and optionally a nucleating agent which is active at the expansion level.

DETAILED DESCRIPTION OF THE PREFERRED EMBODIMENTS

While the rigid materials of the present invention may be prepared from a copolymer of propylene and a minor amount (i.e., not greater than 10 wt. %) of an alpha-olefin which may have up to 6 carbon atoms, it is preferable to use an isotactic polypropylene homopolymer, the articles obtained from said homopolymer having better physical properties. In order to increase the number of crystallization nuclei in the polypropylene, an agent which modifies and increases the crystallization speed is introduced and dispersed in the polymer. This agent is generally used in an amount from about 500 ppm to about 5000 ppm, based on the weight of polymer. Examples of agents improving the crystallization speed include dibenzilidene sorbitol, sodium bis(4-tert-butylphenol)phosphate, sodium benzoate or still a mixture comprising a monocarboxylic aromatic acid or a polycarboxylic aliphatic acid and a silicate or an aluminosilicate of a metal of Group I or II of the Periodic System. This type of crystallization agent is described in European Patent Application No. 85,968 filed in the name of the Assignee and published on Aug. 17, 1983 which is hereby incorporated by reference in its entirety.

The blowing agent may be of the type generally used for the production of expanded polypropylene. Examples of such include citric acid, mixtures of citric acid and bicarbonate of alkali metal or ammonium, azodicarbonamide, diazoaminobenzene, azo-bis-isobutyronitrile, inert gases and analogs. The blowing agent may comprise one or more additives as for instance an agent reducing its decomposition temperature.

The amount of blowing agent to be used depends on its nature and on the desired density for the expanded polypropylene. Said amount is generally from about 0.2 to about 0.7 parts per 100 parts by weight of polymer, and the proper amount can easily be determined by those skilled in the art. However, it has been noted that, with the same amount of blowing agent, the density of a rigid expanded material of the present invention is lower than that of a similar material obtained from polypropylene which does not contain any agent improving the crystallization speed.

In order to reduce the mean size of the cells formed in the expanded polypropylene, it may be advantageous to additionally incorporate a nucleating agent into the polymer, said nucleating agent acting at the expansion level. Generally, such as agent would consist essentially of a solid inorganic matter which is finely divided. Due to said additive, the blowing agent forms cells which are finely and uniformly dispersed within the polymer.

The compositions may also contain the usual additives, as for instance, coloring and/or drying agents, fire-proofing agents, antioxidants and/or antistatic agents.

These compositions allow the preparation, by means of usual processes well known to those skilled in the art, the rigid materials the density of which is from about $4.10 \times 10^{-6}$ to about $8.10 \times 10^{-6}$ Newton/mm$^3$, depending on the amount of blowing agent used. Preferably, the density of the sheets, plates or boards is from about $5.5 \times 10^{-6}$ to about $7.5 \times 10^{-6}$ Newton/mm$^3$. It has been noted that the rigid materials which are obtained have a uniform density, the variations from any point of the material to another not exceeding about 2 to 3%.

The materials of the present invention made of expanded crystalline polypropylene are also characterized by a high crystallization rate, which results from a high crystallization speed. This property is determined by measuring the crystallization temperature, which is in fact the temperature at which the crystallization speed is maximum. This measurement is carried out by using the DSC method (differential scanning calorimetry). To this end, the material to be examined is heated up to about 180° C., and thereafter cooled down. At the beginning, release of the calories follows a regular pattern, and when crystallization appears again, the amount of calories liberated increases. The temperature at which this liberation of calories is maximum is called the crystallization temperature. The materials of the present invention have a crystallization temperature of from about 115° C. to about 135° C., and preferably from about 115° C. to about 130° C. This temperature is affected by the crystallization speed modifying agent used, and by the cooling speed adopted (5° to 20° C./min).

Another property of the materials of the present invention which is of particular interest is the mechanical resistance, especially the resistance to deformation which, when combined to the rigidity resulting from the high crystallization speed, renders these materials particularly desirable. Starting with sheets of these materials, containers may be produced by thermoforming the sheets, these containers having high mechanical strength, which is higher than that present in similar articles obtained from expanded polypropylene having a low crystallization speed. The resistance to deformation is determined by the flexural modulus, according to the ASTM D. 790/71 method.

Generally, the materials of the present invention have a flexural modulus which is at least 5% higher than that of similar materials, of same specific gravity, but prepared from polypropylene the crystallization speed of which is not improved.

Due to the existence of a relationship between the value of the flexural modulus and the specific gravity of the material, the ratio flexural modulus/specific gravity is used for comparison purposes. With the materials of the present invention, the ratio is from about $1.50 \times 10^8$ to about $1.70 \times 10^8$ mm and is most often from about $1.52 \times 10^8$ to about $1.68 \times 10^8$ mm.

As previously mentioned, the materials of the invention are obtained by extrusion of the compositions hereabove described. It has been noted that the use of these compositions leads to an increase of the extrusion yield of about 10 to 15% when compared to a similar treatment of a composition based on polypropylene which does not contain any agent which modifies the crystallization speed. On the other hand, various objects may be easily manufactured by thermoforming the obtained sheets made of expanded crystalline polypropylene. That possibility is really surprising, because the state of the art teaches that, in order to thermoform unexpanded crystalline polypropylene, it is necessary to introduce a thermoplastic resin within the polypropylene in order to reduce the crystallization rate.

Moreover, the objects obtained from the compositions of the invention are dimensionally stable, even at the exit of the thermoforming apparatus. On the contrary, articles manufactured from other compositions reach that stability only after a significant period of time. Owing to that property and to the increase of the extrusion rate, the production rate of the articles like containers, is improved.

The following examples will illustrate the features and other advantages of the compositions of the present invention but are not intended to define or limit the scope of the invention.

EXAMPLE 1

Expanded sheets of 2 mm tickness were prepared by extruding compositions containing polypropylene and citric acid as blowing agent.

The following grades of polypropylene were used:
isotactic polypropylene which does not contain any agent improving the crystallization speed (called polypropylene P1);
—polypropylene obtained by blending P1 with 0.3% by weight of a mixture comprising adipic acid and zeolite 4A (weight ratio 1:3), said improved polypropylene being called P2;
polypropylene obtained by blending P1 with 0.3% by weight of benzilidene sorbitol, said blend being called P3;
polypropylene obtained by blending P1 with 0.3% by weight of sodium bis(4-tert-butylphenol) phosphate, said blend being called P4;
polypropylene obtained by blending P1 with either 0.1% or 0.7% by weight of talc, said blends being called P5 and P6 respectively.

Polypropylene P1 and blends P5 and P6 are outside the scope of the present invention and are given only for comparison.

The crystallization temperature of the different types of polypropylene was determined, by first heating to 180° C. and thereafter cooling.

For some, the determination was made at different cooling speeds. The obtained results are shown in Table I.

TABLE 1

| Polypropylene type | Cooling speed (°C./min) | Crystallization temperature (°C.) |
| --- | --- | --- |
| P1 | 20 | 103.7 |
|  | 10 | 108.2 |
|  | 5 | 112.1 |
| P2 | 20 | 122.1 |
|  | 10 | 127.4 |
|  | 5 | 130.7 |
| P3 | 20 | 115.8 |
| P4 | 20 | 122.7 |
| P5 | 20 | 110.1 |
| P6 | 20 | 112.2 |

With each type of polypropylene, sheets with a density of $6.57 \times 10^{-6}$ Newton/mm$^3$, and sheets with a density of $6.96 \times 10^{-6}$ Newton/mm$^3$ were manufactured. These different densities were obtained by using different amounts of blowing agent.

For each sheet, the flexural modulus was determined in the extrusion direction as well as in the direction perpendicular to the extrusion.

The values given in Table 2 are the mean of these determinations.

TABLE 2

| Polypropylene type | Density d ($10^{-6}$ N/mm$^3$) | Flexural Modulus MF(N/mm$^2$) | Ratio Mf/d ($10^8$ mm) |
| --- | --- | --- | --- |
| P1 | 6.57 | 958.5 | 1.46 |
|  | 6.96 | 1021.5 | 1.47 |
| P2 | 6.57 | 1023.5 | 1.56 |
|  | 6.96 | 1163.5 | 1.67 |
| P3 | 6.57 | 1012.5 | 1.54 |
|  | 6.96 | 1062.5 | 1.52 |
| P4 | 6.57 | 1025.5 | 1.56 |
|  | 6.96 | 1169. | 1.68 |
| P5 | 6.57 | 922.5 | 1.48 |
|  | 6.96 | 1084.5 | 1.49 |

EXAMPLE 2

Expanded polypropylene sheets were manufactured from polypropylene P2 and 0.4% by weight of azodicarbonamide as blowing agent.

These sheets had a density d of $6.2 \times 10^{-6}$ Newton/mm$^3$ and a ratio Mf/d of $1.54 \times 10^8$ mm.

The variation of density between different points of the sheet did not exceed 2.2%.

By way of comparison, sheets were prepared according to the same operating conditions, except that polypropylene P1 was used instead of polypropylene P2.

The obtained sheets had a density d of $7.3 \times 10^{-6}$ Newton/mm$^3$ and a ratio Mf/d of $1.48 \times 10^8$ mm.

The variation of density between different points of the sheet reached 7.8%.

EXAMPLE 3

With the polypropylene compositions of Example 1, expanded polypropylene tubes were manufactured.

The blowing agent used consisted of a mixture of citric acid and sodium bicarbonate in a ratio of 5:3.

The density d and the flexural modulus Mf of these tubes were determined (ASTM D.790 method). The results are shown in the herebelow Table 3.

TABLE 3

| Polypropylene type | Density d ($10^{-6}$ N/mm$^3$) | Flexural Modulus Mf(N/mm$^2$) | Ratio Mf/d ($10^8$ mm) |
| --- | --- | --- | --- |
| P1 | 7.85 | 1003 | 1.28 |
| P2 | 7.85 | 1277 | 1.63 |
| P3 | 6.67 | 1014 | 1.52 |
|  | 6.18 | 945 | 1.53 |
| P4 | 6.57 | 1084 | 1.65 |
| P5 | 7.55 | 1108 | 1.47 |

EXAMPLE 4

Tubes were prepared from blends of polypropylene P2 and various blowing agents, which are indicated in Table 4.

The following results were obtained, the amount of blowing agent being expressed in % with respect to the weight of polypropylene.

TABLE 4

| Blowing Agent Type | Amount | Density ($10^{-6}$ N/mm$^3$) | Flexural Modulus Mf(N/mm$^2$) | Ratio Mf/d ($10^8$ mm) |
| --- | --- | --- | --- | --- |
| Azodicarbonamide | 0.15 | 6.28 | 954 | 1.52 |
| Citric Acid/ sodium bicarbonate (wt ratio 5/3) | 0.35 | 4.12 | 638 | 1.55 |
| Citric Acid | 0.30 | 5.10 | 806 | 1.58 |

The variation of density between different points of the tubes did not exceed 1.8% while that variation reached an average of 7.2% with tubes manufactured with polypropylene P1.

What is claimed is:

1. Rigid materials made of expanded polypropylene characterized by having (i) a uniform specific gravity d of from about $4.1 \times 10^{-6}$ to about $8.1 \times 10^{-6}$ Newton/mm$^3$, (ii) a crystallization temperature of from about 115° C. to about 135° C., and (iii) a flexural modulus Mf expressed in Newton/mm$^2$ such that the ratio MF:d is from about $1.50 \times 10^8$ and $1.70 \times 10^8$ mm.

2. Rigid materials according to claim 1, characterized by having a crystallization temperature of from about 115° C. to about 130° C.

3. Rigid materials according to claim 1, having a ratio Mf/d of from about $1.52 \times 10^8$ to about $1.68 \times 10^8$ mm.

4. Expanded polypropylene sheets of claim 1 obtained by extruding a polymeric composition comprising:
   (a) isotactic polypropylene;
   (b) an agent for increasing the crystallization speed of said polymeric composition; and
   (c) a blowing agent.

5. The sheets of claim 4 wherein said polymeric composition further comprises a nucleating agent.

6. The sheets of claim 4 wherein the agent for increasing the crystalliztaion speed is selected from the group consisting of dibenzilidene sorbitol, sodium bis(4-tert-butyl-phenol)phosphate, sodium benzoate, a mixture comprising a monocarboxylic aromatic acid or a polycarboxylic aliphatic acid and a silicate or an alumino-silicate of a metal of Group I or II of the Periodic System, and any mixture thereof.

7. The sheets of claim 6 wherein said agent is present in an amount of from about 500 ppm to about 5000 ppm based on the weight of polypropylene.

8. The sheets of claim 4 wherein the isotactic polypropylene is selected from the group consisting of propylene homopolymer, a copolymer of propylene and not greater that 10 wt. % of an alpha-olefin having up to 6 carbon atoms, and any mixture thereof.

9. The sheets of claim 4 characterized by having a variation in density of less than 5%.

10. The sheets of claim 4 wherein said blowing agent is present in sufficient amounts to give the sheets a density of from about $4.1 \times 10^{-6}$ to about $8.1 \times 10^{-6}$ Newton/mm$^3$.

11. Expanded polypropylene tubes of claim 1 obtained by extruding a polymeric composition comprising:
   (a) isotactic polypropylene;
   (b) an agent for increasing the crystallization speed of said polymeric composition; and
   (c) a blowing agent.

12. The tubes of claim 11 wherein said polymeric composition further comprises a nucleating agent.

13. The tubes of claim 11 wherein the agent for increasing the crystalliztaion speed is selected from the group consisting of dibenzilidene sorbitol, sodium bis(4-tert-butyl-phenol)phosphate, sodium benzoate, a mixture comprising a monocarboxylic aromatic acid or a polycarboxylic aliphatic acid and a silicate or an alumino-silicate of a metal of Group I or II of the Periodic System, or any mixture thereof.

14. The tubes of claim 13 wherein said agent is present in an amount of from about 500 ppm to about 5000 ppm based on the weight of polypropylene.

15. The tubes of claim 11 wherein the isotactic polypropylene is selected from the group consisting of propylene homopolymer, a copolymer of propylene and not greater than 10 wt % of an alpha-olefin having up to 6 carbon atoms, or any mixture thereof.

16. The tubes of claim 11 characterized by having a variation in density of less than 5%.

17. The tubes of claim 11 wherein said blowing agent is present in sufficient amounts to give the sheets a density of from about $4.1 \times 10^{-6}$ to about $8.1 \times 10^{-6}$ Newton/mm$^3$.

* * * * *